United States Patent
Lacy et al.

(10) Patent No.: US 9,757,936 B2
(45) Date of Patent: Sep. 12, 2017

(54) HOT GAS PATH COMPONENT

(71) Applicant: General Electric Company, Schenectady, NY (US)

(72) Inventors: Benjamin Paul Lacy, Greer, SC (US); Srikanth Chandrudu Kottilingam, Simpsonville, SC (US); Christopher Donald Porter, Greenville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 14/584,442

(22) Filed: Dec. 29, 2014

(65) Prior Publication Data
US 2016/0186575 A1    Jun. 30, 2016

(51) Int. Cl.
*F01D 25/12*    (2006.01)
*B22F 5/00*    (2006.01)
(Continued)

(52) U.S. Cl.
CPC ............ *B33Y 80/00* (2014.12); *B22F 3/1055* (2013.01); *B22F 5/009* (2013.01); *B22F 7/062* (2013.01);
(Continued)

(58) Field of Classification Search
CPC . B33Y 80/00; F01D 5/24; F01D 5/225; F01D 5/187; F01D 5/28; F01D 9/07; F01D 25/12; B22F 5/009; B22F 5/04
See application file for complete search history.

(56) References Cited

U.S. PATENT DOCUMENTS 5,486,090 A * 1/1996 Thompson ............... F01D 11/08
                                                            415/173.1
6,394,749 B2 * 5/2002 Yu .......................... F01D 5/187
                                                            415/115
(Continued)

FOREIGN PATENT DOCUMENTS

EP    1052375 A2    11/2000
EP    2497906 A2    9/2012
(Continued)

OTHER PUBLICATIONS

U.S. Appl. No. 14/177,270, filed Feb. 11, 2014.
(Continued)

*Primary Examiner* — Kenneth Bomberg
*Assistant Examiner* — John S Hunter
(74) *Attorney, Agent, or Firm* — Ernest G. Cusick; Hoffman Warnick LLC

(57) ABSTRACT

Various embodiments of the disclosure include a turbomachine component. and methods of forming such a component. Some embodiments include a turbomachine component including: a first portion including at least one of a stainless steel or an alloy steel; and a second portion joined with the first portion, the second portion including a nickel alloy including an arced cooling feature extending therethrough, the second portion having a thermal expansion coefficient substantially similar to a thermal expansion coefficient of the first portion, wherein the arced cooling feature is located within the second portion to direct a portion of a coolant to a leakage area of the turbomachine component.

12 Claims, 8 Drawing Sheets

(51) Int. Cl.
   *F01D 5/22*   (2006.01)
   *F01D 11/24*  (2006.01)
   *B22F 3/105*  (2006.01)
   *B22F 7/06*   (2006.01)
   *B33Y 80/00*  (2015.01)
   *B33Y 10/00*  (2015.01)

(52) U.S. Cl.
   CPC .............. *B33Y 10/00* (2014.12); *F01D 5/225* (2013.01); *F01D 11/24* (2013.01); *F01D 25/12* (2013.01); *B22F 2999/00* (2013.01); *F05D 2230/31* (2013.01); *F05D 2230/51* (2013.01); *F05D 2240/11* (2013.01); *F05D 2240/81* (2013.01); *F05D 2260/202* (2013.01); *Y02P 10/295* (2015.11)

(56) References Cited

U.S. PATENT DOCUMENTS

| | | |
|---|---|---|
| 6,420,677 B1 | 7/2002 | Emer et al. |
| 6,744,020 B2 | 6/2004 | Shirakawa et al. |
| 7,019,257 B2 | 3/2006 | Stevens |
| 7,147,899 B2 | 12/2006 | Fernihough et al. |
| 7,820,267 B2 | 10/2010 | Fahndrich |
| 8,153,923 B2 | 4/2012 | Beck et al. |
| 8,245,519 B1 | 8/2012 | Liang |
| 2005/0241147 A1 | 11/2005 | Arnold et al. |
| 2006/0054079 A1 | 3/2006 | Withey et al. |
| 2009/0053045 A1* | 2/2009 | Nowak ............ F01D 5/28 415/173.1 |
| 2013/0139510 A1* | 6/2013 | Kottilingam ............ F01D 9/04 60/722 |
| 2013/0287546 A1 | 10/2013 | Lacy et al. |

FOREIGN PATENT DOCUMENTS

| | | |
|---|---|---|
| EP | 2620594 A1 | 7/2013 |
| WO | 9527126 A1 | 10/1995 |
| WO | 2014150365 A1 | 9/2014 |

OTHER PUBLICATIONS

U.S. Appl. No. 14/164,707, filed Jan. 27, 2014.
U.S. Appl. No. 14/037,887, filed Sep. 26, 2013.
U.S. Appl. No. 14/053,758, filed Oct. 15, 2013.
U.S. Appl. No. 14/014,528, filed Aug. 30, 2013.
U.S. Appl. No. 14/020,997, filed Sep. 9, 2013.
U.S. Appl. No. 14/472,483, filed Aug. 29, 2014.
European Search Report issued in connection with corresponding EP Application No. 15200043.6 dated May 18, 2016.
European Search Report and Opinion issued in connection with corresponding EP Application No. 15200043.6 dated Nov. 4, 2016.

* cited by examiner

HOT GAS PATH COMPONENT

GOVERNMENT LICENSE RIGHTS

This invention was made with Government support under contract number DE-FC26-05NT42643, awarded by the Department of Energy. The government has certain rights in the invention.

FIELD OF THE INVENTION

The subject matter disclosed herein relates to gas turbomachines. More particularly, the subject matter disclosed herein relates to components in gas turbomachines, and methods of manufacturing such components.

BACKGROUND OF THE INVENTION

Gas turbomachine components are designed to withstand significant temperatures in order to achieve a desired lifespan. Some of this heat-enduring capability is accounted for in material type, and some is accounted for in the incorporation and design of cooling features in the components. However, as material prices increase, and the ability to manipulate those materials becomes more challenging, the cost of producing a gas turbomachine component with desired lifespan is increasingly difficult.

BRIEF DESCRIPTION OF THE INVENTION

Various embodiments of the disclosure include a turbomachine component. and methods of forming such a component. Some embodiments include a turbomachine component including: a first portion formed of at least one of a stainless steel or an alloy steel; and a second portion bonded to the first portion, the second portion formed of a nickel alloy including an arced cooling feature extending therethrough, the second portion having a thermal expansion coefficient substantially similar to a thermal expansion coefficient of the first portion, wherein the arced cooling feature is located within the second portion to direct a portion of a coolant to a leakage area of the turbomachine component.

A first aspect of the invention includes a turbomachine component including: a first portion formed of at least one of a stainless steel or an alloy steel; and a second portion bonded to the first portion, the second portion formed of a nickel alloy including an arced cooling feature extending therethrough, the second portion having a thermal expansion coefficient substantially similar to a thermal expansion coefficient of the first portion, wherein the arced cooling feature is located within the second portion to direct a portion of a coolant to a leakage area of the turbomachine component.

A second aspect of the invention includes a method including: forging or casting a first portion of a turbomachine component; additively manufacturing a second portion of the turbomachine component, the additively manufacturing of the second portion of the turbomachine component including forming an arced cooling feature within the second portion, the second portion formed of a material having a thermal expansion coefficient substantially similar to a thermal expansion coefficient of the first portion, wherein the arced cooling feature is located within the second portion to direct a portion of a coolant to a leakage area of the turbomachine component; and bonding the second portion to the first portion.

A third aspect of the invention includes a method including: additively manufacturing a section of a turbomachine component, the additively manufacturing of the section of the turbomachine component including forming an arced cooling feature within the section, wherein the arced cooling feature is located within the section to direct a portion of a coolant to a leakage area of the turbomachine component; and bonding the section of the turbomachine component to a preformed base section of the turbomachine component, wherein a thermal expansion coefficient of the section of the turbomachine component and a thermal expansion coefficient of the preformed base section are substantially similar.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
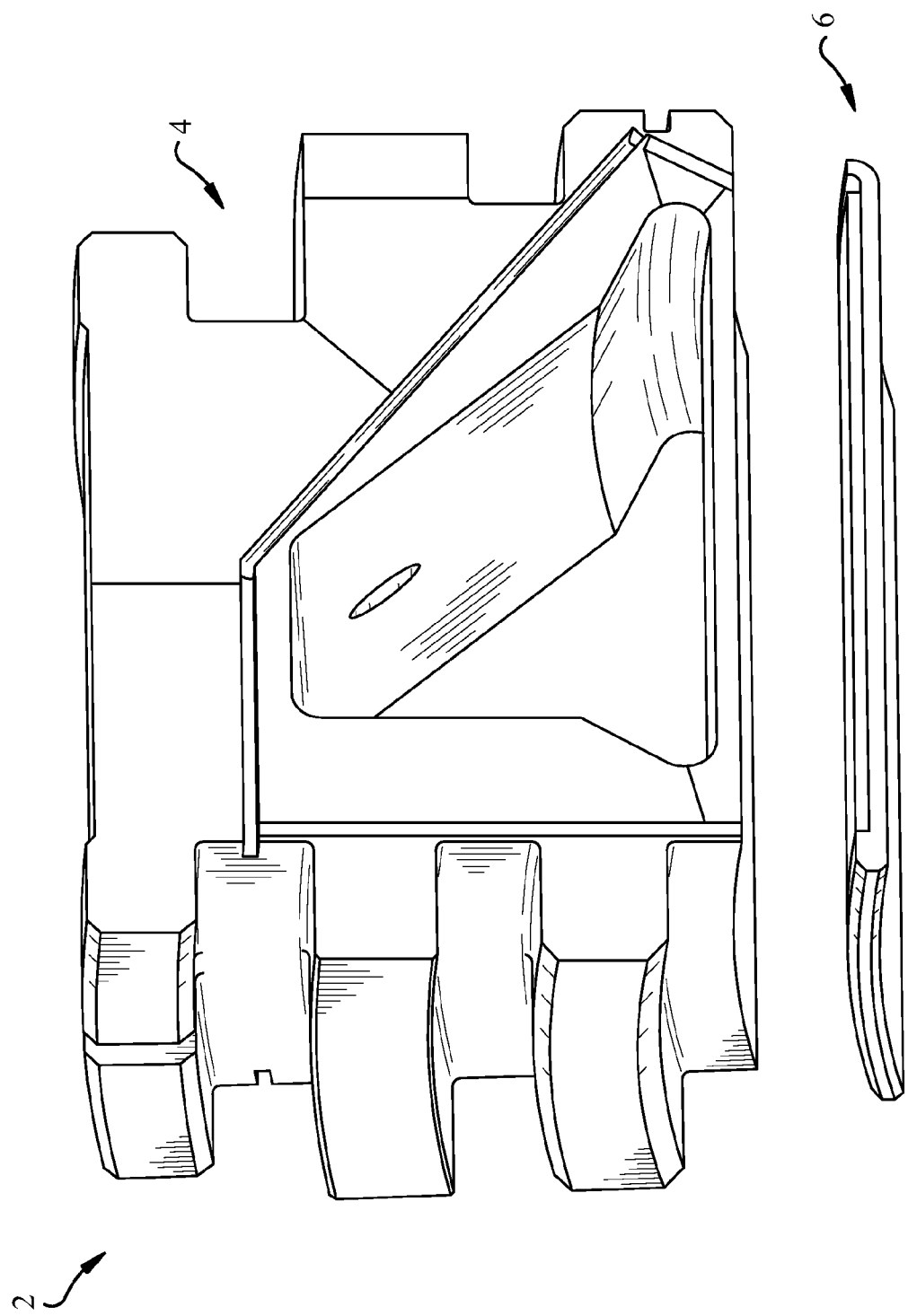
FIG. 1 shows a disjointed three-dimensional perspective view of a turbomachine component according to various embodiments of the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the subject matter disclosed herein relates to gas turbomachines. More particularly, the subject matter disclosed herein relates to components in gas turbomachines, and methods of manufacturing such components.

In contrast to conventional approaches, various aspects of disclosure include approaches for forming a cooling feature in a (gas) turbomachine component, e.g., in a hot-gas-path (HGP) component, and the turbomachine component formed including such a component. Various particular aspects include forming a portion of the turbomachine component by conventional forging or casting, and using additive manufacturing to form the remainder (second portion) of the turbomachine component, where the second portion includes the cooling feature. The process can further include bonding the first portion with the second portion after forming the cooling feature.

In various embodiments, the cooling feature can include a gradual, or arced pathway, which allows coolant to flow through the component, effectively transferring heat away from the component. In various embodiments, the first portion of the component and the second portion of the component are formed of the same material. However, in various embodiments, the second portion is formed of a different material than the first portion, but has a thermal expansion coefficient that is approximately the same (or similar) as that of the material of the first portion. For example, the thermal expansion coefficient may vary by approximately 5-25 percent. It is understood that according to various other embodiments, an additional cooling management configuration could be utilized to reduce the impact of any difference in thermal expansion coefficient between the material of the first portion and the material of the second portion. These other embodiments may allow for a difference in thermal expansion coefficient between the material of the first portion and the material of the second portion of greater than 10 percent.

In some cases, the first portion can be formed of a stainless steel or an alloy (e.g., HR-120 alloy, available from Haynes International, Kokomo, Ind.). In various embodiments, the second portion can be formed of a nickel alloy (e.g., IN-625 or IN-617, both available from the Special Metals Corporation, New Hartford, N.Y.; or H-230, H-282 or HX alloy, each also available from Haynes International).

In various embodiments, the turbomachine component can include a shroud of a turbomachine (e.g., gas turbomachine) blade (or bucket). As is known in the art, the shroud is located at the radially outer portion of the blade, and guards the tip of the blade as it rotates within the turbomachine. In various embodiments, the turbomachine component can include a shroud on a first stage blade (stage one shroud (S1S)), or a shroud on a second stage blade (stage two shroud (S2S)).

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative of various aspects of the invention.

As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

Figure 2:
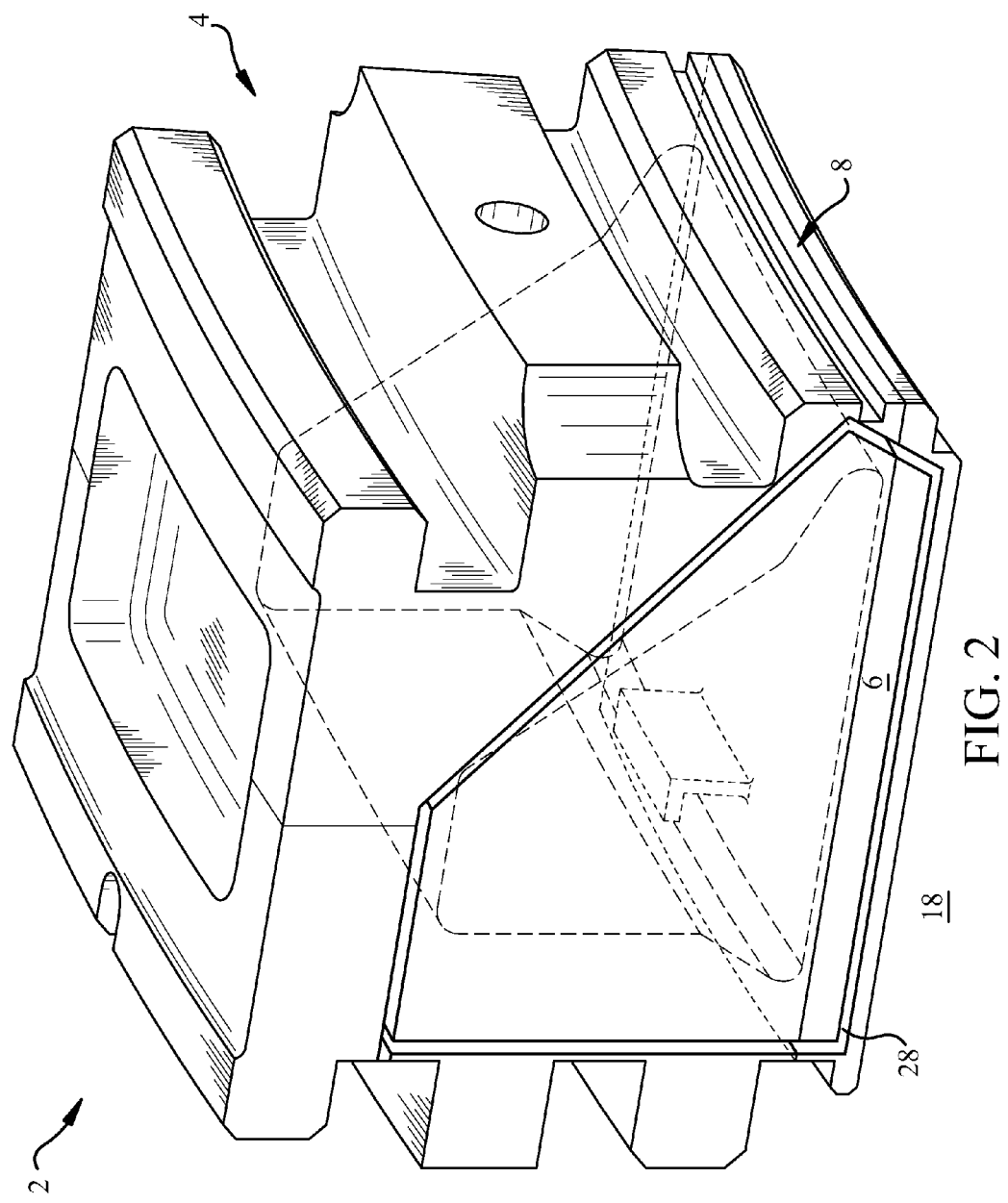
FIG. 2 shows a partially transparent three-dimensional perspective view of the turbomachine component of FIG. 1, according to various embodiments of the disclosure.

FIG. 1 shows a three-dimensional perspective view of a sectioned turbomachine component 2, showing separation of two portions (sections) of the component for the purposes of illustration. FIG. 2 shows the turbomachine component 2 in a partially transparent three-dimensional perspective view.

As shown in FIG. 1 and FIG. 2, the turbomachine component 2 (e.g., a gas turbomachine component, such as one in a hot gas path section of the gas turbomachine) can include a first portion 4 formed of at least one of: a) stainless steel; or b) an alloy steel. The first portion 4 can be formed according to various embodiments described herein, for example, the first portion 4 can be forged or cast from stainless steel or an alloy steel. The first portion 4 is joined to a second portion 6 (shown separated in FIG. 1), for example, by a braze or weld joint 8. The second portion 6 is shown in greater detail in the three-dimensional perspective views in FIGS. 3-5.

The second portion 6 can be formed of a nickel alloy or material with similar thermal expansion characteristics, and can be additively manufactured separately from the first portion 4. In various embodiments, as described herein, the second portion 6 is formed using a three-dimensional printing process, or other additive manufacturing process allowing for formation of particular cooling features 10 (FIGS. 3-5), described in further detail herein. The material forming the section portion 6 can have a thermal expansion coefficient (or, heat transfer coefficient) substantially similar to the material used to form the first portion 4. In various embodiments, the second portion 6 is formed of a distinct material than the first portion 4, which can help to reduce the overall costs of the turbomachine component 2, as the second portion 6 may be formed of a less expensive material (e.g., nickel alloy or similar thermally conductive material) that can be manipulated by additive manufacturing. However, although the material forming the second portion 6 may be a distinct material than that forming the first portion 4, the two materials may have a substantially similar thermal expansion coefficient, that is the second portion 6 may have thermal expansion coefficients that varies by less than approximately 25 percent from the thermal expansion coefficient of the first portion 4. As noted herein, according to various other embodiments, an additional cooling management configuration could be utilized to reduce the impact of any difference in thermal expansion coefficient between the material of the first portion and the material of the second portion. These other embodiments may allow for a difference in thermal expansion coefficient between the material of the first portion and the material of the second portion of greater than 25 percent.

Figure 6:
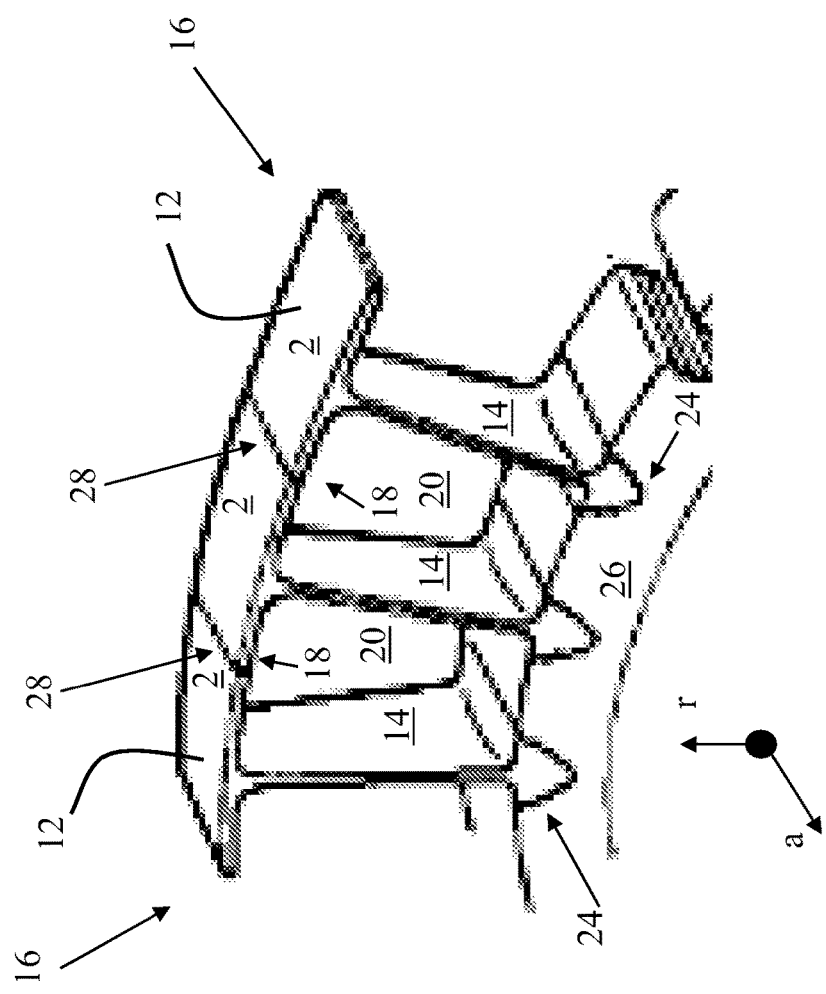
FIG. 6 shows a three-dimensional perspective view of a set of turbomachine buckets according to various embodiments of the disclosure.

Collectively, the first portion 4 and the second portion 6 can form a turbomachine bucket shroud (or simply, shroud) 12, illustrated in the three-dimensional perspective view of FIG. 6. As described herein, the shroud 12 can be coupled with a turbomachine airfoil 14, via conventional joining techniques (e.g., welding, brazing, etc.) to form a turbomachine bucket (or nozzle) 16 (several buckets/nozzles shown). Alternatively, a similar method may be used to form a portion of a nozzle endwall(s), either as two separate portions (e.g., similarly to first portion 4 and second portion 6), or where the entirety of the endwall is formed as described with respect to the second portion 6. These endwall(s) could then be bonded to a turbomachine airfoil to form a complete turbomachine nozzle.

Figure 3:
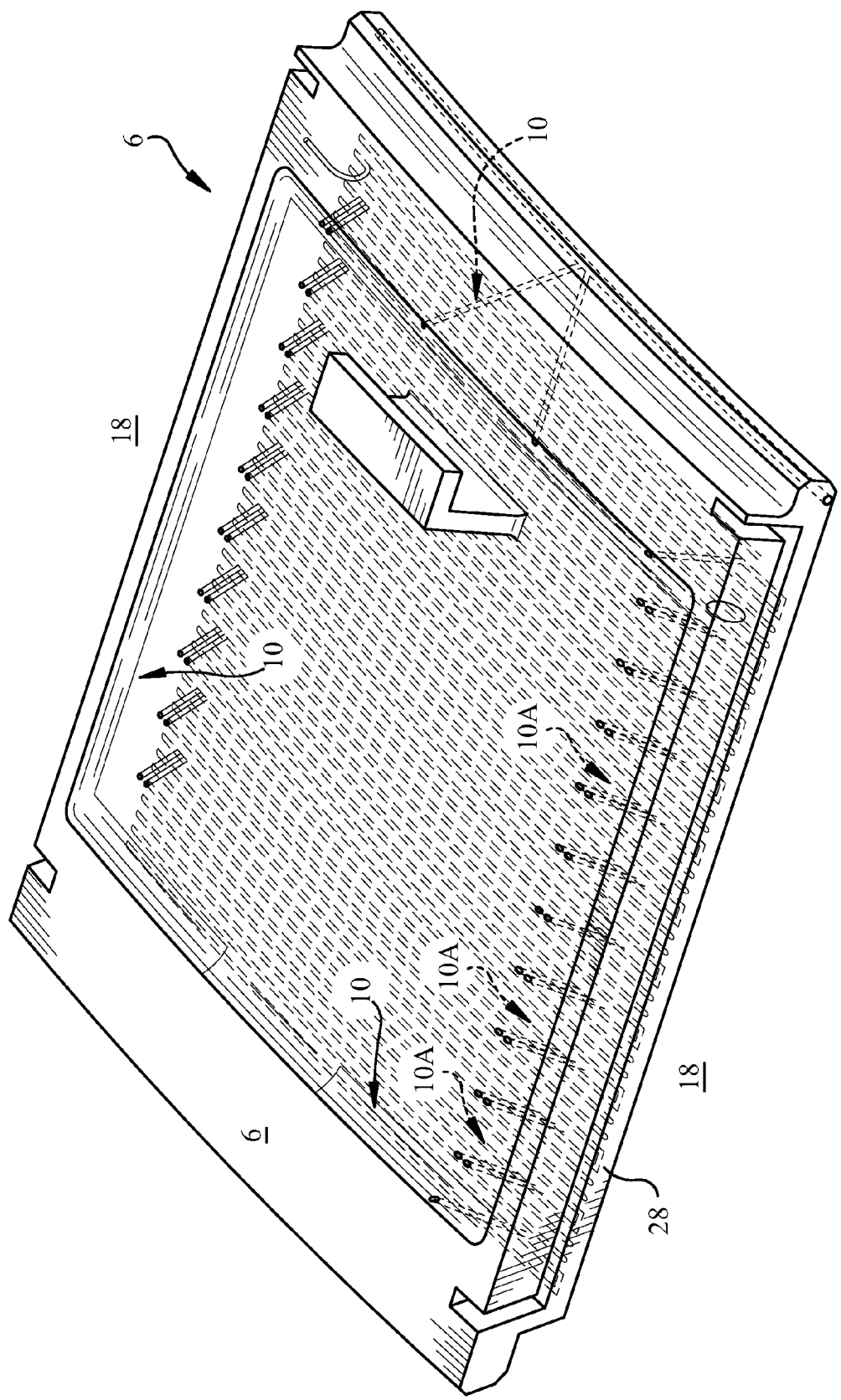
FIG. 3 shows a three-dimensional perspective view of a portion of the turbomachine component of FIGS. 1-2 according to various embodiments of the disclosure.
Figure 4:
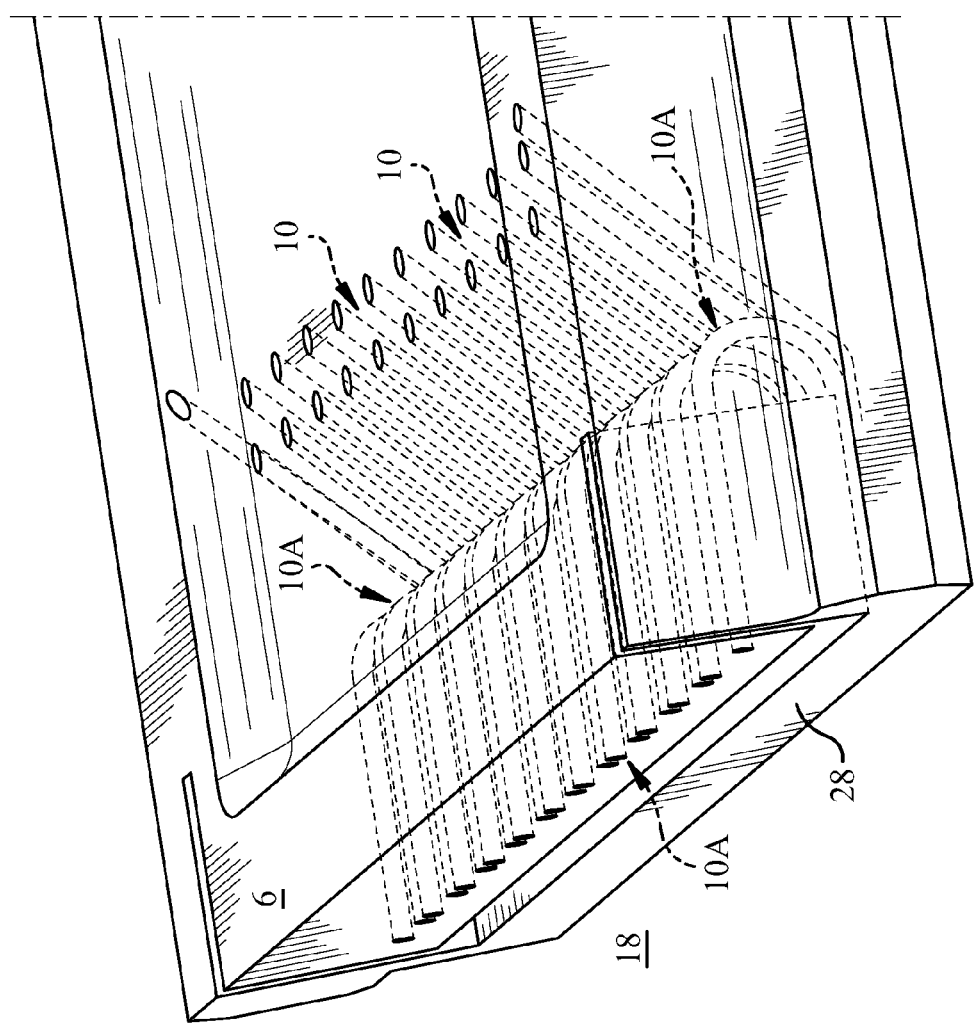
FIG. 4 shows a close-up three-dimensional perspective view of a portion of the turbomachine component of FIGS. 1-3 according to various embodiments of the disclosure.
Figure 5:
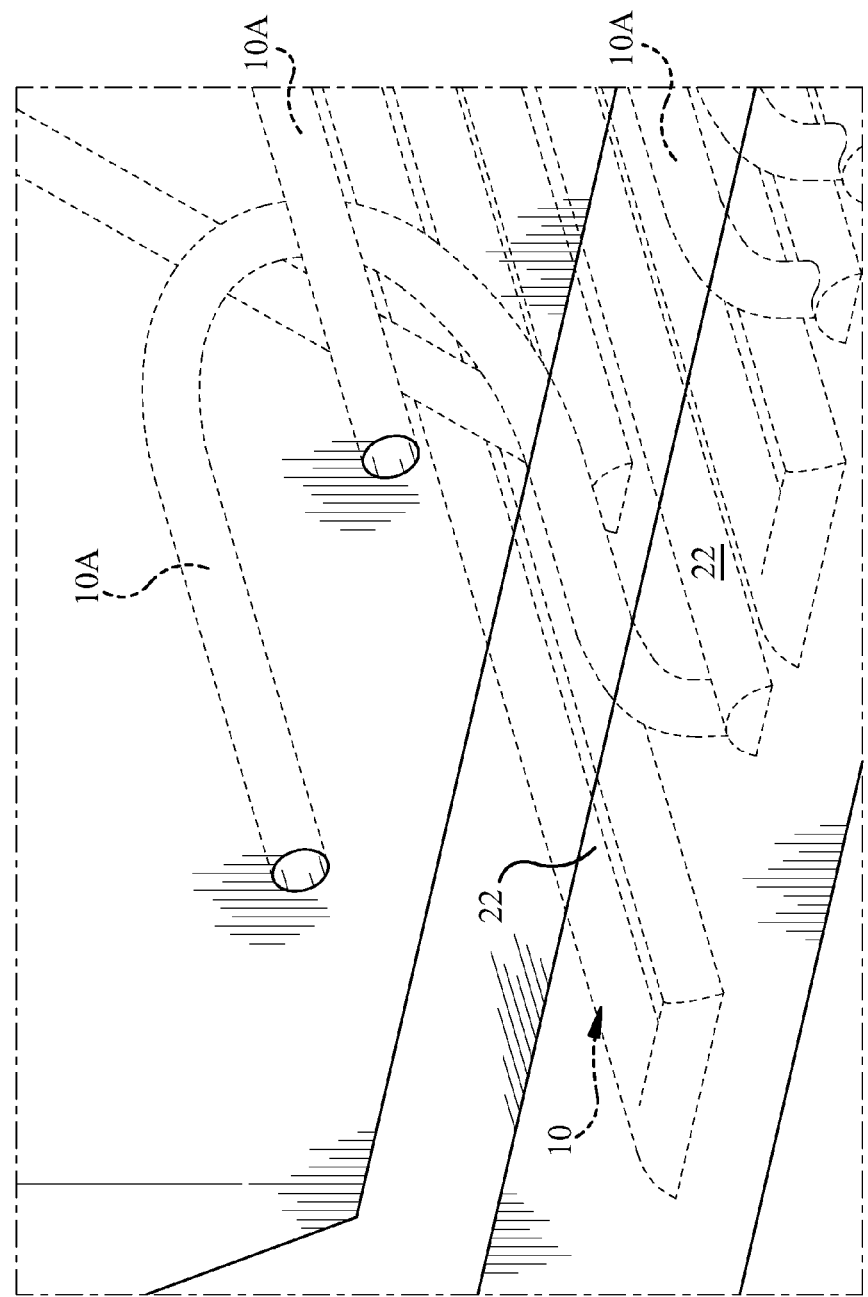
FIG. 5 shows a second close-up three-dimensional perspective view of a portion of the turbomachine component of FIGS. 1-3 according to various embodiments of the disclosure.

As shown in FIGS. 3-5, the second portion 6 can include a plurality of cooling features 10, in particular, at least one arced cooling feature 10A, for directing a portion of a coolant to a leakage area 18 of the turbomachine component 2 (shroud). The leakage area 18 is located proximate a joint between adjacent shrouds 12 in a set of turbomachine shrouds 12 (FIG. 6). That is, the leakage area 18 is distinct from the hot gas path (HGP) region 20, where the gas primarily impacts the airfoils 14 and affects mechanical motion of the blades as they rotate about a rotor, as is known in the art. The leakage area 18 is located between adjacent bucket shrouds 12, as shown in FIG. 6.

Various conventional cooling paths direct a coolant into, the HGP region 20, which result in inefficient usage of the coolant. In contrast, various cooling features 10, e.g., the arced cooling features 10A can direct coolant flow to the leakage area 18 between adjacent shrouds, such that coolant can be reused as leakage/cooling flow through the leakage flow path. Additionally, the arced shape of cooling features 10A allows those features to enhance surface area contact with the shroud 12 (when compared with straight-line cooling features), enhancing heat transfer from the shroud 12. Various additional cooling features 10 are shown in the bucket shroud 12 (e.g., in the second portion 6), which form a winding path 22 through the second portion 6.

It is understood that according to various embodiments, the various cooling features 10, and in particular, the arced cooling features 10A, can be formed by a series of angled, intersecting holes, or a series of interconnected plenums, which allow the flow of coolant to loop back over the leakage area 18. That is, the cooling features 10 may include features which have a generally arched shape, but are not necessarily composed entirely of arcuate features.

As shown in FIG. 6, the buckets (nozzles) 16 can be inserted into slots 24 in the rotor body 26, as is known in the art. The axis of rotation of the rotor body 26 is denoted as axis "a", and the radial direction "r" is shown relative to that axis of rotation (a). As described herein, the arced cooling features 10A can include at least one outlet or inlet at the circumferentially facing edge 28 of shroud 12, which faces a similarly circumferentially facing edge 28 of an adjacent shroud 12.

As described herein, the turbomachine component 2 (e.g., gas turbine shroud 12) can be formed according to various processes, for example, in two separate processes (one for each portion 4, 6), and subsequently bonded together. This approach can allow for forming arced (cooling feature 10A) or otherwise complex cooling features using additive manufacturing (e.g., three-dimensional printing or layered deposition techniques).

Figure 7:
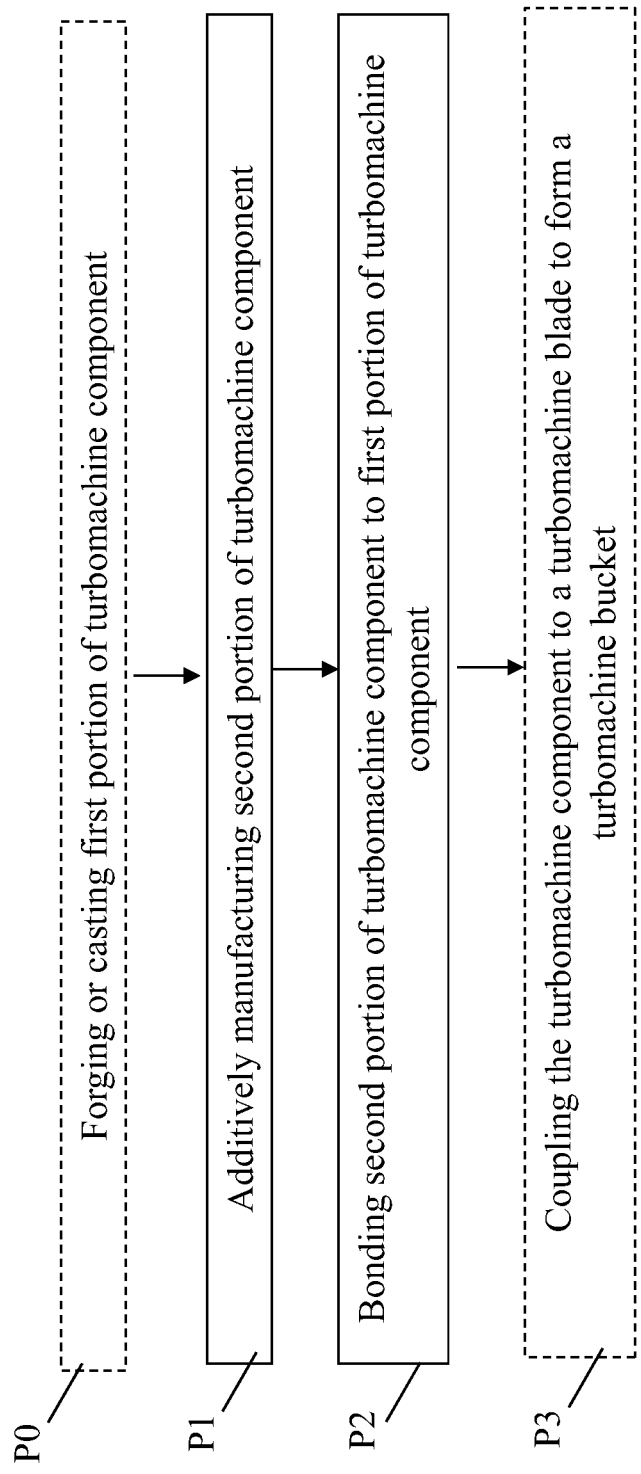
FIG. 7 shows a flow chart depicting processes according to various embodiments of the disclosure.

FIG. 7 shows a flow chart illustrating various processes in a method according to embodiments. As shown, processes can include:

Process P0 (optional pre-process, depicted in phantom): forging or casting a first portion 4 of a turbomachine component 2. As noted herein, this first portion 4 can be forged or cast from stainless steel or an alloy steel. In various embodiments, the first portion 4 may be formed prior to, or after, subsequently listed processes (e.g., forming second portion 6). In some cases, the first portion 4 can be forged or cast by a separate entity, e.g., a contracting entity, bulk producer, etc. and provided as a base for subsequent processes described herein. That is, in various embodiments, the first portion 4 may be obtained without being forged or cast by the same entity that manufactures the second portion 6, or bonds the first portion 4 with the second portion 6 to form the component 2;

Process P1: additively manufacturing the second portion 6 of the turbomachine component 2. As described herein, additively manufacturing the second portion 6 can include three-dimensional printing and/or layered deposition techniques, and the source material for the second portion 6 can include a nickel alloy. In any case, the thermal expansion coefficient of the source material for the second portion 6 can be substantially similar (+/−25%) of the thermal expansion coefficient for the first portion 4, to prevent undesirable differential thermal expansion during operation, e.g., in gas turbomachine). In additively manufacturing the second portion 6, an arced cooling feature 10A (along with other cooling features 10) is formed, where the arced cooling feature 10A is sized and located to direct a portion of a coolant (e.g., liquid coolant such as water) to a leakage area 18 of the component 2. Process P2, in the case that the additive manufacturing includes three-dimensional printing, can be performed, e.g., by at least one computing device controlling a three-dimensional printer, as described herein;

Process P2: joining the second portion 6 to the first portion 4. This process can include brazing or welding the two portions 4, 6 together, using conventional brazing/welding techniques. Process P2 may be performed after the second portion 6 is fully formed, or, in some embodiments, depending upon the manufacturing approach (e.g., additive manufacturing), while the second portion is in a nearly finalized state. Bonding the first portion 4 and the second portion 6 can form a complete shroud 12, as described herein; and Process P3 (optional post-process, depicted in phantom): coupling the turbomachine component 2 (turbomachine shroud 12) to a turbomachine airfoil 14, to form a turbomachine bucket (or nozzle) 16. This process can include welding or brazing the turbomachine component 2 to an end of the airfoil 14, according to conventional welding and/or brazing techniques.

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

In any case, the technical effect of the various embodiments of the disclosure, including, e.g., the AM control system 904, is to additively manufacturing a portion (e.g., second portion 6) of a turbomachine component 2.

The above-described turbomachine component 2 (e.g., second portion 6) can be manufactured using additive manufacturing. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) direct metal laser melting (DMLM), and/or electron-beam (EB) melting. In some embodiments, DMLM has been found to be advantageous.

Figure 8:
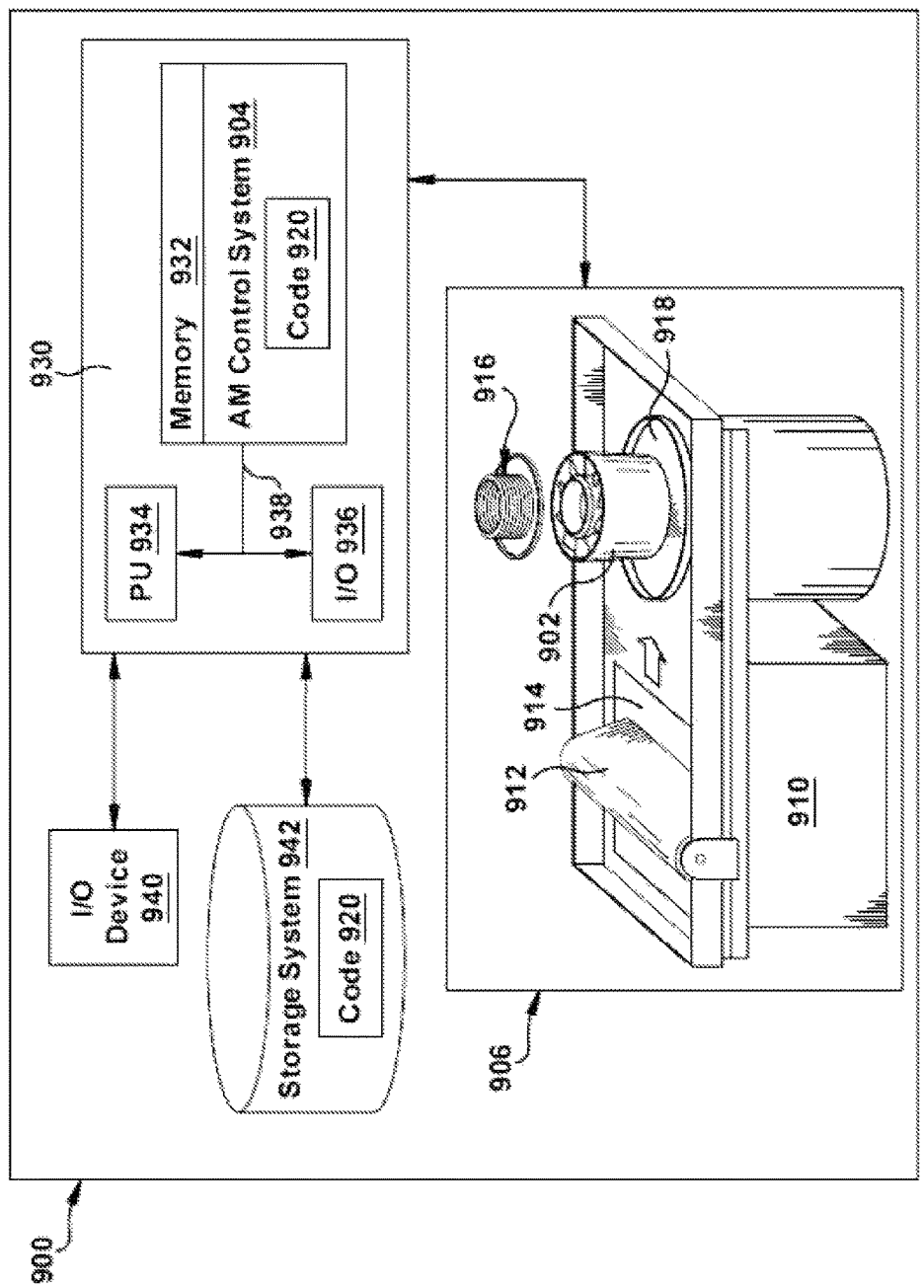
FIG. 8 shows a block diagram of an additive manufacturing process including a non-transitory computer readable storage medium storing code representative of an turbomachine component according to various embodiments of the disclosure.

To illustrate an example additive manufacturing process, FIG. 8 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture turbomachine component 2 (e.g., second portion 6). AM system 900 generally includes a computerized additive manufacturing (AM) control system 904 and an AM printer 906. AM system 900, as will be described, executes code 920 that includes a set of computer-executable instructions defining the object to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, turbomachine component 2 (e.g., second portion 6) may be made of any conventional turbomachine component material such as nickel based alloys, or other suitable materials for combustion system applications. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 932 is shown in communication with an external I/O device/resource 940 and a storage system 942. In general, processor 934 executes computer program code, such as AM control system 904, that is stored in memory 932 and/or storage system 942 under instructions from code 920 representative of turbomachine component 2 (e.g., second portion 6), described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of component 2. As noted, code 920 includes a set of computer-executable instructions defining turbomachine component 2 (e.g., second portion 6) that can be used to physically generate the tip, upon execution of the code by system 900. For example, code 920 may include a precisely defined 3D model of turbomachine component 2 (e.g., second portion 6) and can be generated from any of a large variety of well known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing turbomachine component 2 (e.g., second portion 6) into a series of thin slices that it assembles using AM printer 906 in successive layers of liquid, powder, sheet or other material. In the DMLM example, each layer is melted to the exact geometry defined by code 920 and fused to the preceding layer. Subsequently, the turbomachine component 2 (e.g., second portion 6) may be exposed to any variety of finishing processes, e.g., minor machining, sealing, polishing, etc.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbomachine component comprising:
   a first portion including at least one of a stainless steel or an alloy steel; and
   a second portion joined with the first portion, the second portion including a nickel alloy and including an arced pathway extending therethrough having an outlet, the second portion having a thermal expansion coefficient differing by 5 percent to 25 percent from a thermal expansion coefficient of the first portion, the second portion having a leakage surface configured to be circumferentially facing and located in an axial-radial plane of a turbomachine, the leakage surface including the outlet,
   wherein the arced pathway is configured to direct a portion of a coolant to a leakage area of the turbomachine component by way of the outlet, wherein the arced pathway loops back over itself in a radial direction in a plane perpendicular to the axial-radial plane.

2. The turbomachine component of claim 1, further comprising a weld joint or a braze joint bonding the second portion to the first portion.

3. The turbomachine component of claim 1, wherein the first portion and the second portion collectively form a gas turbine shroud.

4. The turbomachine component of claim 3, further comprising a turbomachine airfoil connected with the gas turbine shroud.

5. The turbomachine component of claim 4, wherein the turbomachine airfoil and the gas turbine shroud form a bucket or a nozzle.

6. The turbomachine component of claim 1, wherein the arced pathway has a serpentine shape and is fluidly coupled with a cooling pathway extending through the second portion.

7. A turbomachine component comprising:
   a first portion including at least one of a stainless steel or an alloy steel; and
   a second portion joined with the first portion, the second portion including a nickel alloy and including an arced pathway extending therethrough having an outlet, the second portion having a thermal expansion coefficient differing by less than 25 percent from a thermal expansion coefficient of the first portion, the second portion having a leakage surface configured to be circumferentially facing and located in an axial-radial plane of a turbomachine, the leakage surface including the outlet
   wherein the arced pathway is configured to direct a portion of a coolant to a leakage area of the turbomachine component by way of the outlet, wherein the arced pathway includes a series of intersecting plenums for allowing flow of the coolant to loop back over in a radial direction in a plane perpendicular to the axial-radial plane,
   wherein the first portion and the second portion collectively form a turbomachine shroud.

8. The turbomachine component of claim 7, further comprising a turbomachine airfoil coupled with the turbomachine shroud.

9. A set of turbomachine buckets, comprising:
   a plurality of adjacent turbomachine buckets each having:
      a shroud including:
         a first portion including at least one of a stainless steel or an alloy steel; and
         a second portion joined with the first portion, the second portion including a nickel alloy and including an arced pathway extending therethrough having an outlet, the second portion having a thermal expansion coefficient differing by less than 25 percent from a thermal expansion coefficient of the first portion, the second portion having a leakage surface configured to be circumferentially facing and located in an axial-radial plane of a turbomachine, the leakage surface including the outlet; and
      a turbomachine airfoil coupled with the shroud,
      wherein the arced pathway is configured to direct a portion of a coolant to a leakage area of the turbomachine component by way of the outlet, wherein the arced pathway loops back over itself in a radial direction in a plane perpendicular to the axial-radial plane, the leakage area located between adjacent shrouds of the plurality of adjacent turbomachine buckets; and
   a hot gas path between adjacent airfoils of the adjacent turbomachine buckets, wherein the hot gas path is distinct from the leakage area.

10. The set of turbomachine buckets of claim 9, wherein each of the shrouds includes a circumferentially facing edge facing a circumferentially facing edge of the adjacent shroud, wherein the arced pathway includes at least one outlet or inlet at the circumferentially facing edge.

11. The set of turbomachine buckets of claim 9, wherein the arced pathway includes a series of intersecting plenums for allowing flow of the coolant to loop back over the leakage area.

12. The set of turbomachine buckets of claim 9, wherein the arced pathway loops back over itself to direct the portion of the coolant to the leakage area.

* * * * *